(12) United States Patent
Mitsutake

(10) Patent No.: US 8,421,712 B2
(45) Date of Patent: Apr. 16, 2013

(54) DISPLAY APPARATUS

(75) Inventor: Ichiro Mitsutake, Tokyo (JP)

(73) Assignee: Azbil Corporation, Tokyo (JP)

( * ) Notice: Subject to any disclaimer, the term of this patent is extended or adjusted under 35 U.S.C. 154(b) by 1197 days.

(21) Appl. No.: 12/264,360

(22) Filed: Nov. 4, 2008

(65) Prior Publication Data
US 2009/0115689 A1    May 7, 2009

(30) Foreign Application Priority Data

Nov. 6, 2007  (JP) ................... 2007-288302

(51) Int. Cl.
*G09G 3/04*    (2006.01)
(52) U.S. Cl.
USPC .......................................... 345/33
(58) Field of Classification Search .............. 345/33–35; 340/815.44, 815.45; 702/45–47
See application file for complete search history.

(56) References Cited

U.S. PATENT DOCUMENTS

| | | | |
|---|---|---|---|
| 5,686,831 A | 11/1997 | Vandervalk et al. | |
| 7,390,093 B2 * | 6/2008 | Bell et al. | 353/31 |
| 7,391,388 B2 * | 6/2008 | Schultz | 345/32 |
| 2005/0091431 A1 | 4/2005 | Olodort et al. | |
| 2006/0240879 A1 | 10/2006 | Heikkinen | |

FOREIGN PATENT DOCUMENTS

| | | |
|---|---|---|
| DE | 19525685 | 1/1997 |
| EP | 1431950 | 6/2004 |
| EP | 2071298 A1 | 6/2009 |
| FR | 2867855 | 9/2005 |
| JP | 06-129650 A | 5/1994 |
| JP | 2007-101325 A | 4/2007 |
| JP | 2007-101825 | 4/2007 |
| JP | 2007-256559 A | 10/2007 |

OTHER PUBLICATIONS

Invitation pursuant to Article 94(3) and Rule 71(1) EPC dated Mar. 29, 2012 from the European Patent Office (EPO), for EP application No. 08 253 631.9, which is the EPO counterpart to the instant U.S. application.

* cited by examiner

*Primary Examiner* — Abbas Abdulselam

(74) *Attorney, Agent, or Firm* — Troutman Sanders LLP

(57) ABSTRACT

A liquid crystal display part includes a seven segment display group and first and second switches. If the first switch "on", a display provided by the seven segment display group is switched to a normal direction display having an upward orientation. In addition, if the second switch is "on," then the display provided by the seven segment display group is switched to an inverse direction display having a downward direction. In addition, a first character pattern that indicates the unit of the measurement value is displayed for the normal direction display, and a second character pattern that indicates the unit of the measurement value is displayed for the inverse direction display. A cover is openably, closably, and rotatably provided to the liquid crystal display part, and the display direction of the measurement value is switched according to the position of the cover.

6 Claims, 10 Drawing Sheets

DISPLAY APPARATUS

CROSS REFERENCE TO RELATED APPLICATION

This application claims the benefit under 35 U.S.C. §119 of Japanese Patent Application No. 2007-288302, filed on Nov. 6, 2007, which is hereby incorporated by reference herein in its entirety.

FIELD OF THE INVENTION

The present invention relates to a display apparatus that uses a segmented character display to represent one character at a fixed position by the combination of ON/OFF states of a plurality of display elements.

BACKGROUND OF THE INVENTION

Conventional measuring instruments are available that measure one or more physical quantities of a measurement target and display these measured physical quantities as measurement values on a display part. Measuring instruments are often installed directly on or in the vicinity of the object to be measured.

Examples of such measuring instruments include field-installed apparatus such as pressure gauges, flow meters, and thermometers installed in factories. Other examples include water meters attached to water piping and gas meters attached to gas piping. Depending on the installation site environment, a worker needing to check the measuring instrument display may have to work in a constricted space, which might make it difficult for him or her to read the measurement value as displayed. For example, there may be cases in which the measurement value must be read upside down because its display direction on the display part is fixed in this direction.

Accordingly, an LCD display apparatus for a measuring instrument has been proposed, as described in Japanese Unexamined Patent Application Publication No. 2007-101825 (hereinafter "Patent Document 1"), which is hereby incorporate by reference herein in its entirety, having a display part that is devised so that its display can be easily checked. The display part of this measuring instrument LCD display apparatus is a dot matrix type liquid crystal display (LCD) part, and the display direction of a character string displayed on the liquid crystal display part can be changed by 90° each time a pushbutton switch is pressed. Thus, and as shown for example in FIG. 15, an operator can change the display direction of the character string on the liquid crystal display part in one of four ways (0°, 90°, 180°, 270°) and thereby select a display direction that is easy for him or her to read.

Nevertheless, a dot matrix type LCD consumes a large amount of power. Moreover, if a dot matrix type LCD is used in a battery operated type measuring instrument (e.g., a water meter or a gas meter), then battery life decreases, which increases the frequency of battery replacement.

SUMMARY OF THE INVENTION

The present invention was conceived in order to solve such problems, and it is an object of the present invention to provide a low power consumption display apparatus wherein the display direction of a character string on a display part can be changed.

In order achieve the abovementioned object, the present invention provides a display apparatus that comprises: a display part that is provided with a segmented character display group, wherein each character is represented at a fixed position by the combination of ON/OFF states of a plurality of display elements; an upward direction switching means that switches the upward direction of a character string displayed in the segmented character display group; and an upward direction switching instructing means that instructs the upward direction switching means to switch the upward direction.

In a preferred embodiment of the present invention, the display part is provided with a seven segment display group, which serves as a segmented character display group, wherein each character (a numeral in the range of 0-9) is represented by the combination of ON/OFF states of, for example, seven display elements (segments). A seven segment display can represent one character by the combination of the ON/OFF states of the segments, which are disposed in the shape of the character "8," even if the upward direction has been inverted. Alternatively, the segmented character display group can be used to form a 16 segment display group, which is capable of displaying alphabetic characters, instead of a seven segment display group.

In the preferred embodiment, if it is difficult to read the display of the character string displayed in the segmented character display group, the upward direction switching means is instructed to switch the upward direction. The upward direction switching instructing means that instructs the switching of the upward direction may comprise a manual switch (such as a pushbutton switch) or an automatic switch (such as a gravity sensor, an infrared light switch, or a magnetic sensor).

In accordance with the present invention, if the upward direction switching means is instructed by the upward direction switching instructing means to switch the upward direction, then the upward direction switching means switches the upward direction of the character string displayed in the segmented character display group. For example, if the segmented character display group is a seven segment display group, then the upward direction of the character string displayed in the seven segment display group is switched by changing the combination of the ON/OFF states of the segments, which are the display elements of each of the eight-shaped seven segment displays. Namely, the normal direction display and the inverse direction display are set by switching the display direction of the character string.

In accordance with the present invention, in addition to a liquid crystal display part (LCD), the display part may be a light emitting diode (LED), a cold cathode discharge lamp, a vacuum fluorescent display, or an incandescent filament. The display part is a segment type display part, and the display direction of the character string in the segment type display part is switched, which makes it possible to reduce power consumption as compared with a matrix display part. In addition, the character segment group provided to the display part can be used regardless of the display direction of the character string.

The display part may be further provided with first and second character patterns, the displays of which alternately switch ON and OFF interlocked with the upward direction switching instruction. For example, a battery alarm that displays a pictograph when it is time to replace the battery may be provided with two patterns, one for the normal direction and one for the inverse direction. If the display direction of the character string is set to the normal direction, the battery alarm for the normal direction is displayed and the battery alarm for the inverse direction is not displayed. Similarly, if the display direction of the character string is set to the inverse direction, then the battery alarm for the inverse direction is displayed and the battery alarm for the normal direction is not displayed.

If the first and second character patterns are provided, they need not be limited to pictographs. For example, they may present characters that display the unit of the measurement value (e.g., $m^3$, $m^3/h$, L/s, ° C., %). In addition, the characters, such as the pictograph and the measurement value unit, of the battery alarm and the like may be combined in a single character pattern, and combinations of these characters may be turned ON and OFF collectively.

In addition, the display part may be provided with a cover that openably and closably covers the display part. Moreover, the open/close directions of the cover with respect to the display part may be sensed, and, based on the detection result of the open/close directions of the cover, the upward direction switching means may be instructed to switch the upward direction. For example, the cover may be rotatably provided to the display part, and the rotational position of the cover (the upward direction position) may be sensed by a magnet that is provided to the cover and two reed switches that are provided in the upward direction of the display part.

If the cover is in the upward direction position of the display part (i.e., in the position at which the cover opens on the upward direction side of the display part), then the display direction of the character string is set to the normal direction because the reed switch in the upward direction is ON and the reed switch in the downward direction is OFF. If the cover is in the downward direction position of the display part (i.e., in the position at which it opens on the downward direction side of the display part), then the display direction of the character string is set to the inverse direction because the reed switch in the upward direction is OFF and the reed switch in the downward direction is ON. In addition, if the display direction of the character string is set to the normal direction, then the first character pattern (e.g., the battery alarm for the normal direction) is displayed. If the display direction of the character string is set to the inverse direction, then the second character pattern (e.g., the battery alarm for the inverse direction) is displayed.

In summary, in accordance with the present invention, a display part is provided with a segmented character display group, wherein each character is represented at a fixed position by the combination of ON/OFF states of a plurality of display elements, and the upward direction of a character string that is displayed in the segmented character display group is switched. Therefore, it is possible to switch the upward direction of the character string in the display part by, for example, pressing a pushbutton switch or rotating a cover, thereby making it possible to reduce power consumption, as compared with a matrix type display part, and to extend battery life. In addition, the segmented character display group provided to the display part can be used regardless of the display direction of the character string, which avoids an increase in the size of the display part and reduces cost.

BRIEF DESCRIPTION OF THE DRAWINGS

The invention will become more readily apparent from the Detailed Description of the Invention, which proceeds with reference to the drawings, in which.

DETAILED DESCRIPTION OF THE INVENTION

Figure 1:
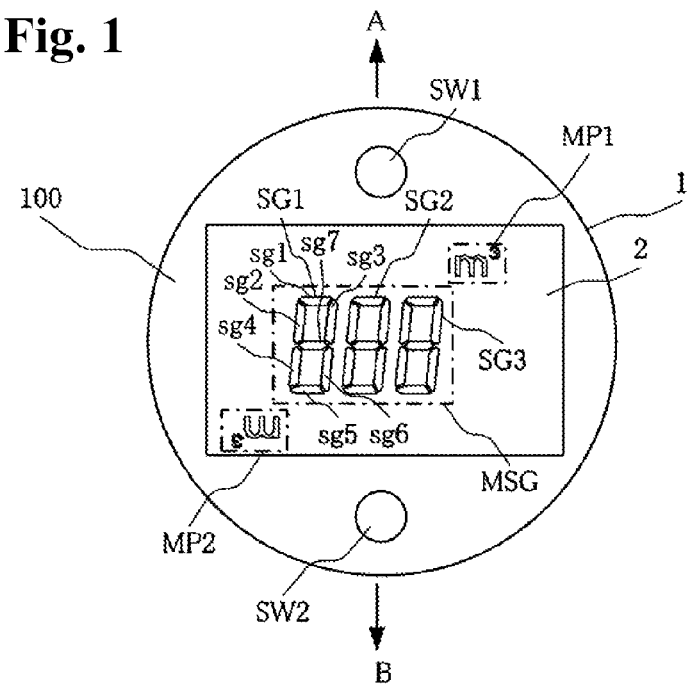
FIG. 1 presents a front view that shows a first embodiment of a display apparatus according to the present invention.

A listing of some of the reference numerals and letters that are used in the drawings, together with descriptions of the corresponding elements, is provided below:

| | |
|---|---|
| 1 | Case |
| 2 | Liquid crystal display part |
| 3 | Control unit |
| 3-1 | Display control unit |
| 3-2 | Upward direction determining unit |
| 3-3 | Cover open/close determining unit |
| 4 | Cover |
| 5 | Engaging part |
| SW1 | First pushbutton switch (first switch) |
| SW2 | Second pushbutton switch (second switch) |
| SG1-SG3 | Seven segment displays |
| sg1-sg7 | Segments |
| MSG | Seven segment display group |
| MP1 | First character pattern |
| MP2 | Second character pattern |
| LS1, LS2 | Reed switches |
| MG1 | Magnet |

-continued

| | |
|---|---|
| MSG1, MSG2 | Seven segment display groups |
| GM1-GM12 | Pictographs |
| UM1-UM6 | Unit characters |
| SM1, SM2 | Sign characters |
| PM1, PM2 | Decimal point characters |
| 100, 101 | Display apparatuses |
| 200, 201 | Electromagnetic flowmeters |

The following description describes several exemplary embodiments of the present invention, with reference to the drawings.

First Embodiment: Type without Cover

Figure 2:
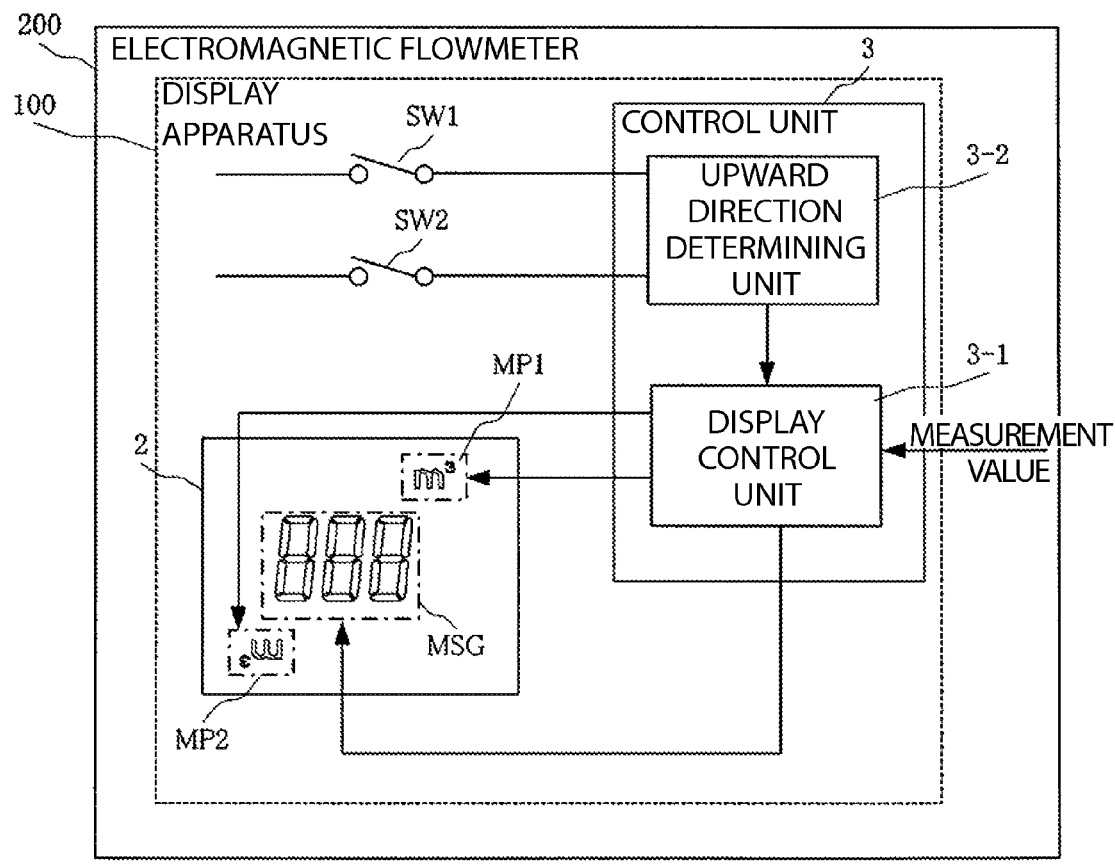
FIG. 2 provides a block diagram that shows the principal parts of an electromagnetic flowmeter, whereto the display apparatus of FIG. 1 may be mounted.

FIGS. 1 and 2 illustrate a first embodiment of a display apparatus according to the present invention. A display apparatus 100 is mounted to an electromagnetic flowmeter. 1 indicates an electromagnetic flowmeter case and 2 indicates a liquid crystal display part (LCD) provided in proximity to an upper surface of the case 1.

A liquid crystal display part 2 is provided with three seven-segment displays SG1, SG2, SG3 that together serve as a group of character displays (seven segment display group) MSG and separately display one character (a numeral in the range of 0-9) by combining the ON/OFF states of seven segments sg1-sg7 disposed in the shape of the number "8" in each display SG1, SG2, SG3. A measurement value (for example, flow volume) of the electromagnetic flowmeter is displayed as a character string in the seven segment display group MSG.

In addition, a first character pattern MP1 and a second character pattern MP2, each of which serves as a character pattern that displays the unit of a measurement value, are provided to the liquid crystal display part 2. In the example illustrated by FIGS. 1 and 2, each of the character patterns MP1, MP2 is a character string "$m^3$", which comprises two segments: "m" and "$^3$" respectively.

In addition, in this example, the character patterns MP1, MP2 are oppositely oriented patterns such that the upward directions of the character strings "$m^3$" are opposite one another. Namely, if we let an arrow A of FIG. 1 indicate the upward direction of the liquid crystal display part 2 and an arrow B indicate the downward direction of the liquid crystal display part 2, then the first character pattern MP1 is provided so that the upward direction of the liquid crystal display part 2 serves as the display direction of the character string "$m^3$" (the normal direction display), and the second character pattern MP2 is provided so that the downward direction of the liquid crystal display part 2 serves as the display direction of the character string "$m^3$" (the inverse direction display). Hereinbelow, the character patterns MP1, MP2 are called unit character patterns.

In addition, in the present example, a first pushbutton switch (hereinbelow, "first switch") SW1 is provided to the liquid crystal display part 2 on the upward direction side and a second pushbutton switch (hereinbelow, "second switch") SW2 is provided to the liquid crystal display part 2 on the downward direction side. The first switch SW1 and the second switch SW2 are mutually interlocked and do not turn ON simultaneously. In addition, only when the first switch SW1 or the second switch SW2 is pressed does it turn ON for several seconds.

Furthermore, the first switch SW1 and the second switch SW2 are not limited to pushbutton switches. They may, for example, be infrared light sensors that turn ON when they sense the contact of a worker's finger, or reed switches that turn ON when they sense the proximity of a portable magnet possessed by the operator.

FIG. 2 is a block diagram that shows the principal parts of an electromagnetic flowmeter 200, whereto the display apparatus 100 is mounted. In the electromagnetic flowmeter 200, the display apparatus 100 is provided with a control unit 3, which totally controls the display on the liquid crystal display part 2. The control unit 3 comprises a display control unit 3-1 and an upward direction determining unit 3-2 that serve as special function blocks of the present embodiment; the function blocks are implemented by hardware, which comprises a processor and a storage apparatus, and a program, which operates cooperatively with the hardware and implements various functions that serve as the display apparatus.

Figure 3:
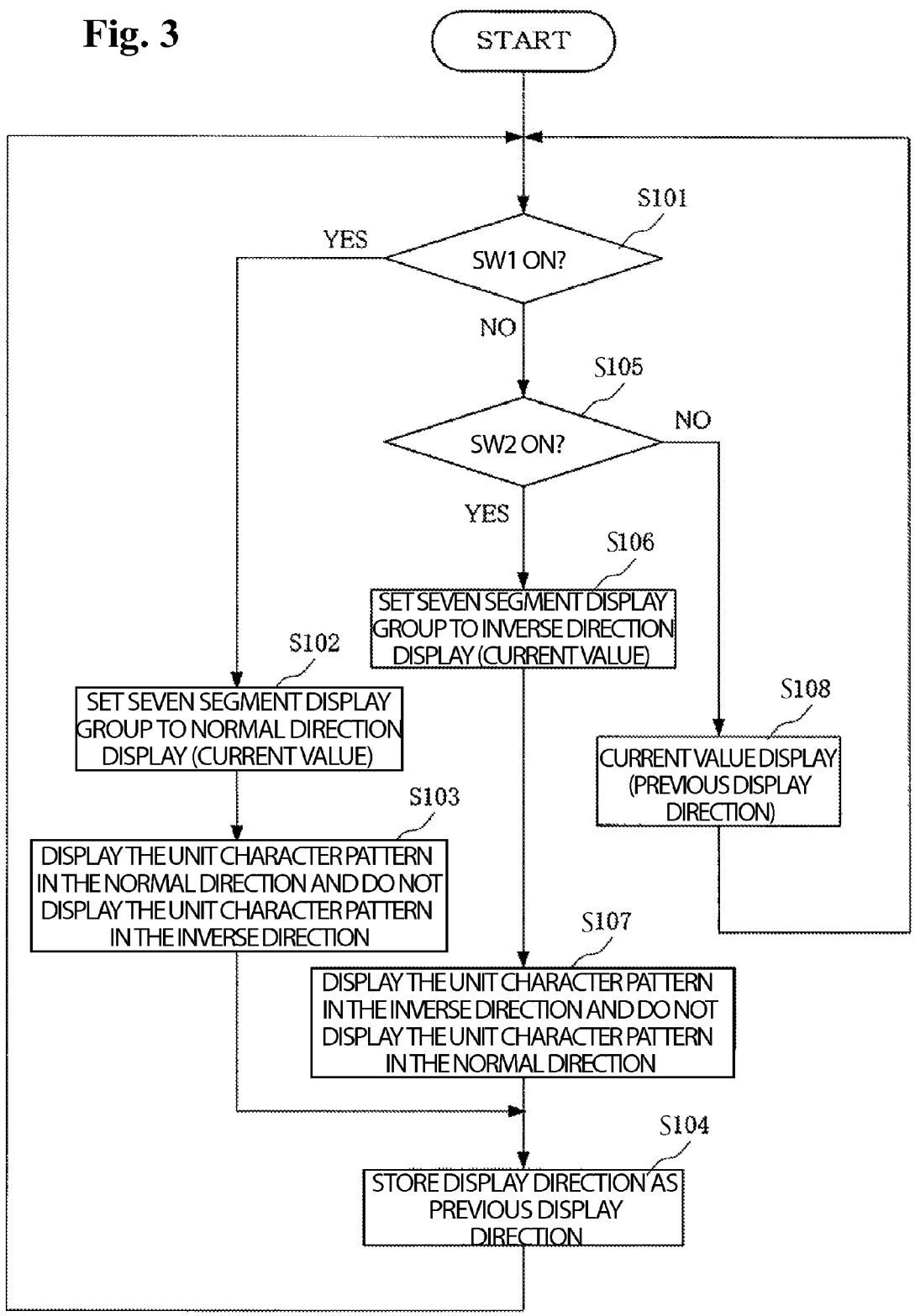
FIG. 3 presents a flowchart that depicts a specific processing operation performed by a control unit of the display apparatus of FIG. 1.

Referencing the flow chart depicted in FIG. 3, the following explains the functions of the display control unit 3-1 and the upward direction determining unit 3-2 in the control unit 3. Furthermore, in the first embodiment of the present invention, the display control unit 3-1 corresponds to what is called in the present invention an upward direction switching means; in addition, the combination of the switches SW1, SW2 and the upward direction determining unit 3-2 corresponds to what is called in the present invention an upward direction switching instructing means.

If the First Switch is ON

Now, let us assume that the first switch SW1 is turned ON. In this case, the upward direction determining unit 3-2 verifies that the first switch SW1 is turned ON (step S101: YES), determines that the upward direction of the liquid crystal display part 2 shall be the display direction of the measurement value on the seven segment display group MSG, and issues a normal direction display instruction to the display control unit 3-1.

Figure 4A:
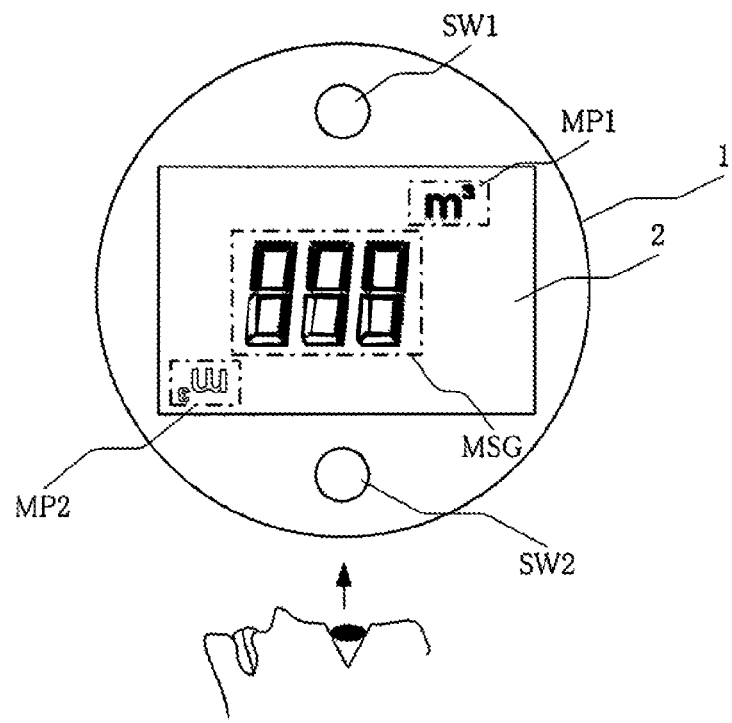
FIGS. 4(a) and 4(b) show a normal direction display example and an inverse direction display example, respectively, of a measurement value displayed in a liquid crystal display part of the display apparatus of FIG. 1.

The display control unit 3-1 receives the normal direction display instruction from the upward direction determining unit 3-2 and displays the measurement value on the seven segment display group MSG in the normal direction (step S102). Namely, as shown in FIG. 4(a), the upward direction of the measurement value displayed in the seven segment display group MSG is set to the upward direction of the liquid crystal display part 2. In addition, the unit character pattern MP1, wherein the upward direction of the liquid crystal display part 2 is the upward direction of the character string, is displayed, and the unit character pattern MP2, wherein the downward direction of the liquid crystal display part 2 is the upward direction of the display string, is not displayed (step S103).

Thereby, if the operator views the liquid crystal display part 2 from the downward direction side, he or she can correctly read the measurement value, including the unit thereof, merely by turning the first switch SW1 ON. After the measurement value has been displayed, the display control unit 3-1 stores the display direction of the measurement value at that time (in this case, the normal direction display) as the previous display direction (step S104).

After the first switch SW1 has been ON for several seconds, it turns OFF again. Thereby, the display control unit 3-1 verifies that the first switch SW1 and the second switch SW2 are turned OFF (step S101: NO; step S105: NO) and then the method proceeds to step S108, whereupon the previous display direction stored in step S104 (here, the normal direction display) is read out and the liquid crystal display part 2 continues to display the measurement value using the previously read-out display direction as the current display direction.

If the Second Switch is ON

Next, let us assume that the second switch SW2 is turned ON. In this case, the upward direction determining unit 3-2 verifies that the second switch SW2 is turned ON (step S105: YES), determines that the downward direction of the liquid crystal display part 2 shall be the display direction of the measurement value on the seven segment display group MSG, and issues an inverse direction display instruction to the display control unit 3-1.

Figure 4B:
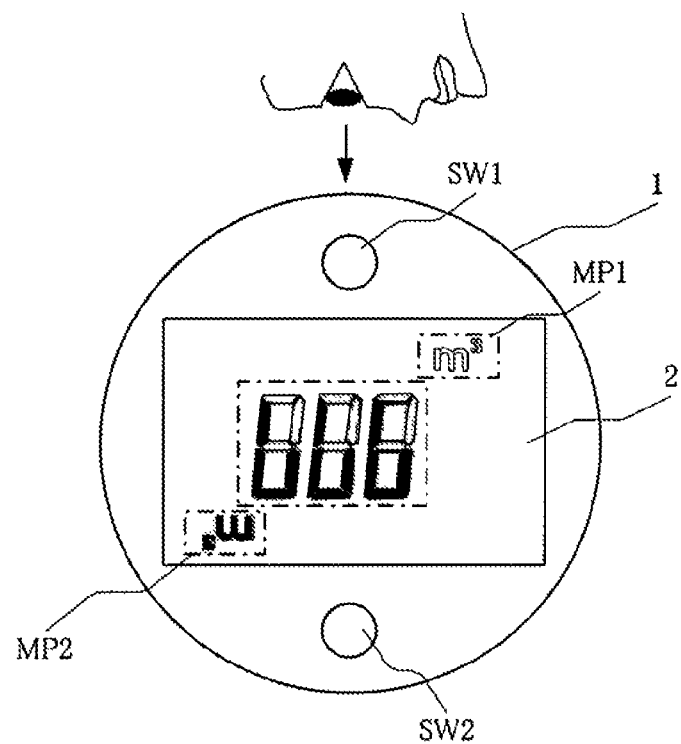

The display control unit 3-1 receives the inverse direction display instruction from the upward direction determining unit 3-2 and displays the measurement value on the seven segment display group MSG in the inverse direction (step S106). Namely, as shown in FIG. 4(*b*), the upward direction of the measurement value displayed in the seven segment display group MSG is set to the downward direction of the liquid crystal display part 2. In addition, the unit character pattern MP2, wherein the downward direction of the liquid crystal display part 2 is the upward direction of the character string, is displayed, and the unit character pattern MP1, wherein the upward direction of the liquid crystal display part 2 is the upward direction of the display string, is not displayed (step S107).

Thereby, if the operator views the liquid crystal display part 2 from the upward direction side, he or she can correctly read the measurement value, including the unit thereof, merely by turning the second switch SW2 ON. After the measurement value has been displayed, the display control unit 3-1 stores the display direction of the measurement value at that time (in this case, the inverse direction display) as the previous display direction (step S104).

After the second switch SW2 has been ON for several seconds, it turns OFF again. Thereby, the display control unit 3-1 verifies that the first switch SW1 and the second switch SW2 are turned OFF (step S101: NO; step S105: NO) and then the method proceeds to step S108, whereupon the previous display direction stored in step S104 (here, the inverse direction display) is read out and the liquid crystal display part 2 continues to display the measurement value using the previously read-out display direction as the current display direction.

As can be understood from the explanation above, in the display apparatus 100 of the first embodiment wherein the segment type liquid crystal display part 2 is used, the upward direction of the measurement value on the liquid crystal display part 2 can be switched by turning the first switch SW1 or the second switch SW2 ON; this makes it possible both to reduce the power consumption as compared with a matrix type liquid crystal display part and to extend the battery life of the electromagnetic flowmeter 200.

In addition, the seven segment display group MSG provided to the liquid crystal display part 2 can be used regardless of the display direction of the measurement value, which avoids an increase in the size of the liquid crystal display part 2 and reduces cost. Namely, while it is conceivable to provide two seven segment display groups MSG, one for the upward direction and one for the downward direction, this would lead to an increase in the size and the cost of the liquid crystal display part 2. In contrast, in the present embodiment, the seven segment display group MSG provided to the liquid crystal display part 2 can also be used in the upward direction and thus serves double duty, which avoids increasing the size of the liquid crystal display part 2 and reduces cost.

Furthermore, in the first embodiment of the present invention, the liquid crystal display part 2 may optionally be provided with a cover, as in the second embodiment discussed below, and the open/close state of the cover may be sensed; in this case, if the cover is closed, then the display on the liquid crystal display part 2 is turned OFF; if the cover is opened, then the display on the liquid crystal display part 2 is turned ON. Ensuring that the display of the liquid crystal display part 2 is turned OFF when the cover is closed makes it possible to reduce power consumption even further.

In addition, it is possible to alternatively provide only one switch rather than each of the first switch SW1 and the second switch SW2, depending on the number of times that the one switch is pressed to switch the display direction of the measurement value displayed on the liquid crystal display part 2.

Second Embodiment: Type with Cover

Figure 5:
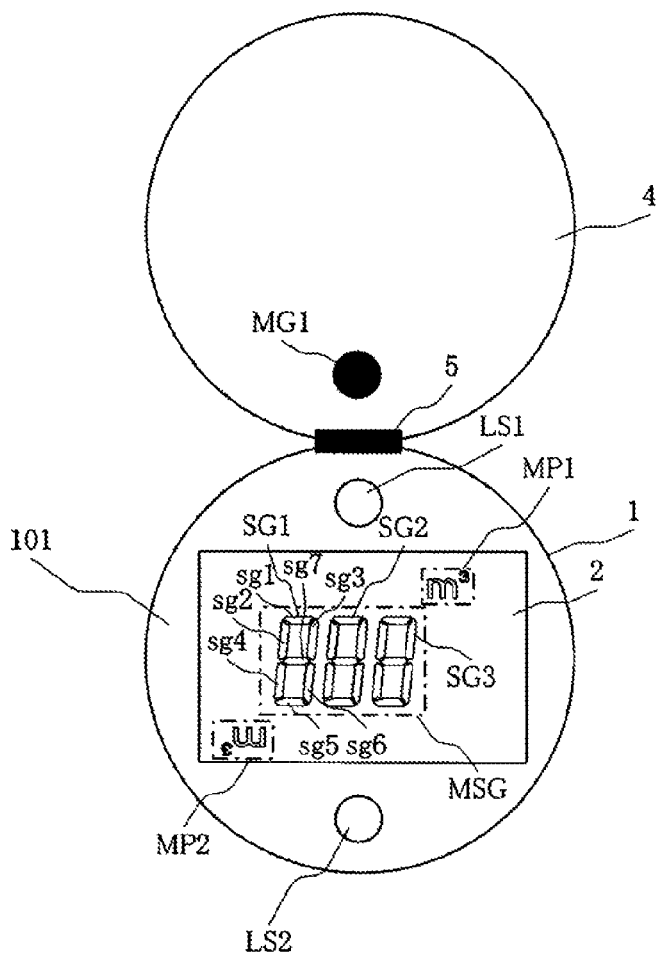
FIG. 5 presents a front view of a cover opened state of a display apparatus according to a second embodiment of the present invention.

FIG. 5 is a front view that shows another embodiment of the display apparatus according to the present invention. A display apparatus 101 is provided with a cover 4, which openably and closably covers the liquid crystal display part 2. Furthermore, symbols in FIG. 5 identical to those in FIG. 1 indicate constituent elements that are identical or equivalent to the corresponding constituent elements explained referencing FIG. 1; therefore, the further explanations thereof are omitted.

In the display apparatus 101, the cover 4 can be rotated with respect to the case 1 in the state wherein the cover 4 is closed with respect to the liquid crystal display part 2 as shown in FIGS. 6(*a*), (*b*). FIG. 6(*a*) shows the state wherein the cover 4 has been rotated and is positioned to be rotatably opened toward the upward direction of the liquid crystal display part 2 (hereinbelow, this position is called the upward direction position). FIG. 6(*b*) shows the state wherein the cover 4 has been rotated and is positioned to be rotatably opened in the downward direction of the liquid crystal display part 2 (hereinbelow, this position is called the downward direction position).

A magnet MG1 is provided to the cover 4 on the side of the liquid crystal display part 2 proximate to an engaging part 5 that engages with the case 1. In the case 1, if the cover 4 is positioned in the upward direction position, then a reed switch LS1, which opposes the magnet MG1, is provided to the liquid crystal display part 2 on the upward direction side; however, if the cover 4 is positioned in the downward direction position, then a reed switch LS2, which opposes the magnet MG1, is provided to the liquid crystal display part 2 on the downward direction side.

Figure 7:
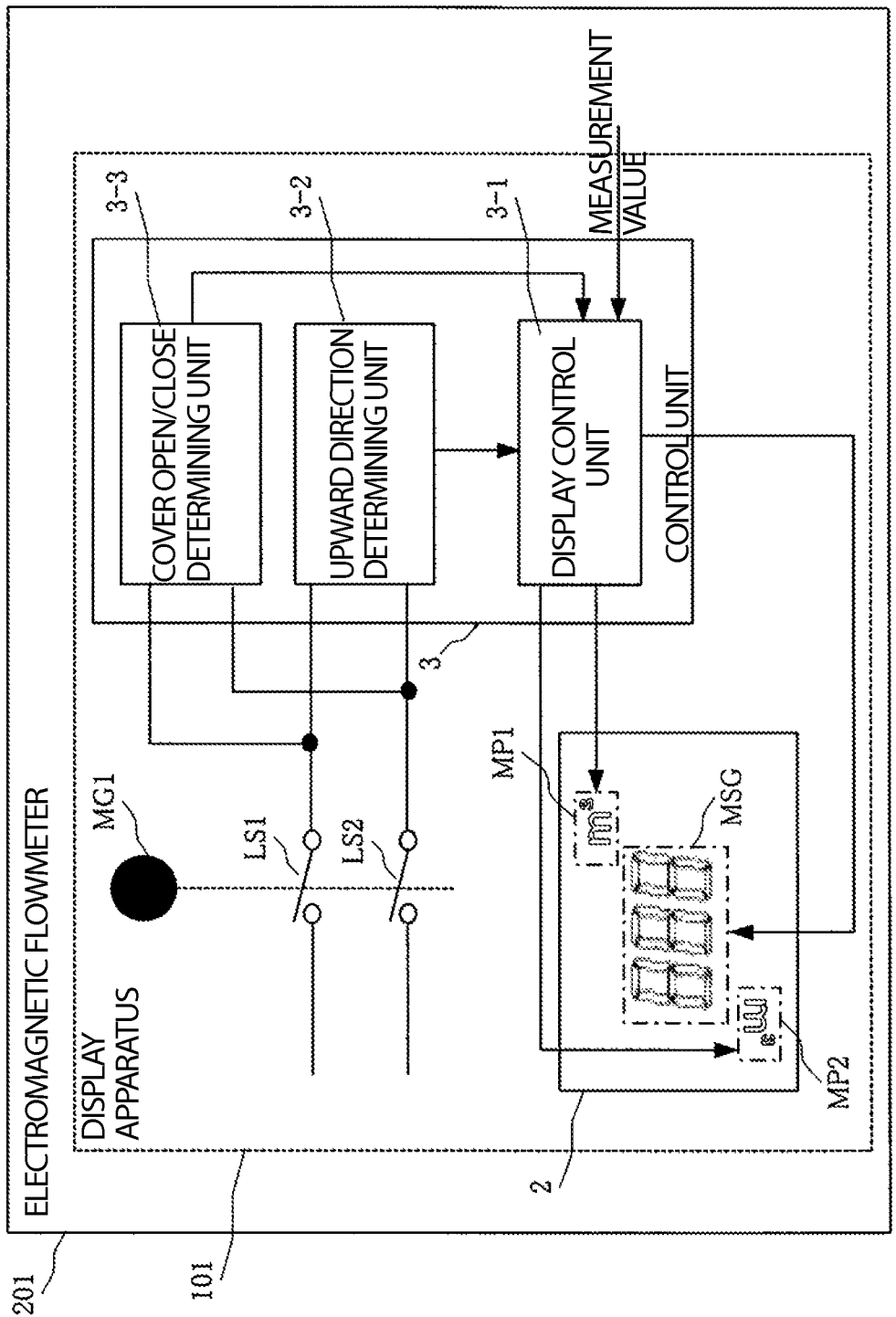
FIG. 7 provides a block diagram that shows the principal parts of the electromagnetic flowmeter whereto the display apparatus of FIG. 5 may be mounted.

FIG. 7 is a block diagram that shows the principal parts of an electromagnetic flowmeter 201 in accordance with the second embodiment of the present invention, whereto the display apparatus 101 is mounted. In the electromagnetic flowmeter 201, the display apparatus 101 is provided with the control unit 3, which totally controls the display on the liquid crystal display part 2. The control unit 3 comprises the display control unit 3-1, the upward direction determining unit 3-2, and a cover open/close determining part 3-3 that serve as special function blocks of the present embodiment; the function blocks are implemented by hardware, which comprises for example a processor and a storage apparatus, and a program, which operates cooperatively with the hardware and implements various functions that serve as the display apparatus.

Figure 8:
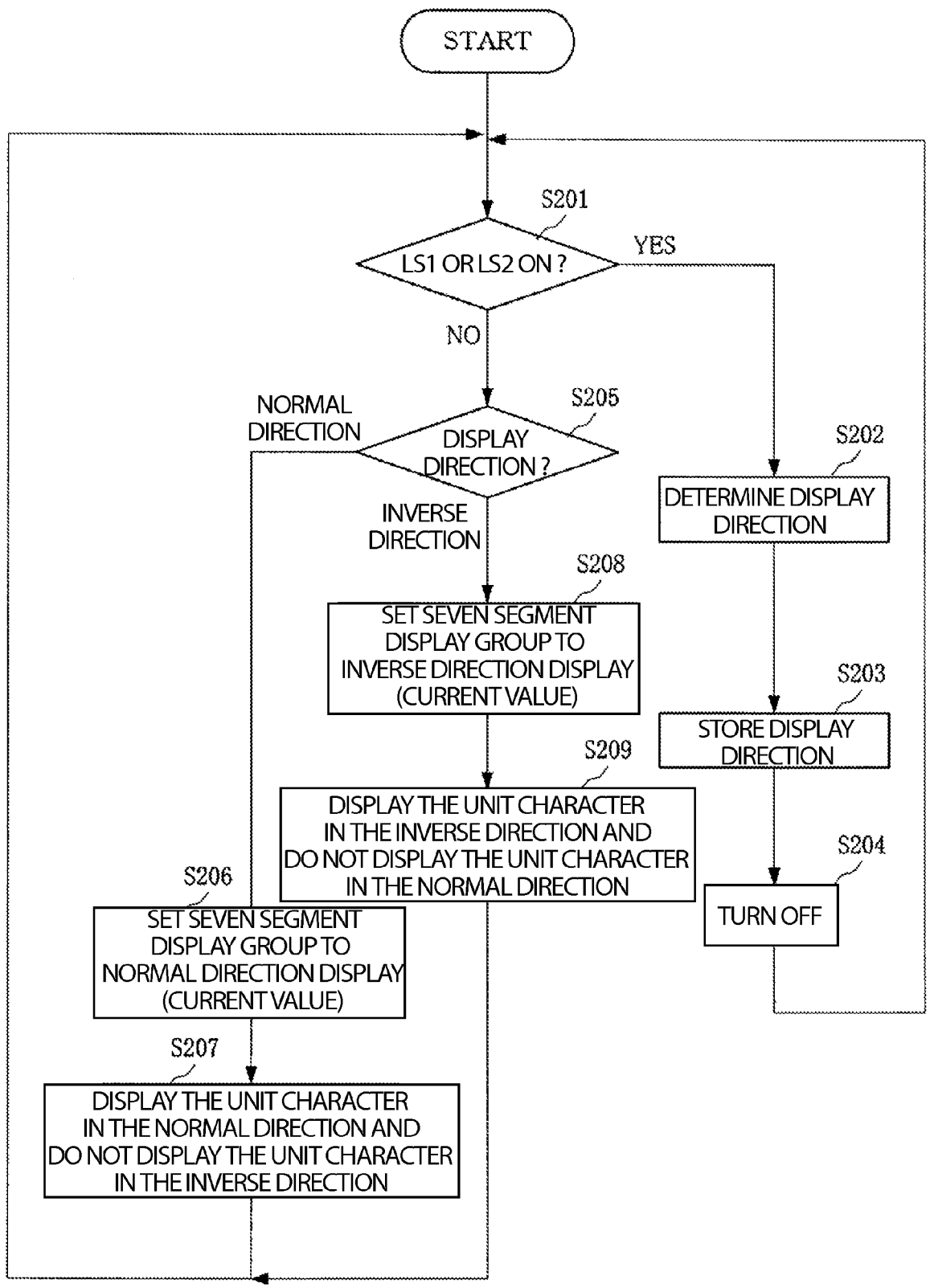
FIG. 8 presents a flow chart that depicts a specific processing operation performed by the control unit of the display apparatus of FIG. 5.

Referencing the flow chart depicted in FIG. 8, the following explains the functions of the display control unit 3-1, the upward direction determining unit 3-2, and the cover open/close determining part 3-3 in the control unit 3. Furthermore, in a second embodiment, the display control unit 3-1 corresponds to what is called in the present invention an upward direction switching means; furthermore, the combination of the magnet MG1, the reed switches LS1, LS2, and the cover open/close determining part 3-3 corresponds to what is called in the present invention a cover open/close detecting means; in addition, the combination of the magnet MG1, the reed switches LS1, LS2, and the upward direction determining unit 3-2 corresponds to what is called in the present invention a cover open/close direction detecting means and an upward direction switching instructing means.

If the Cover is Positioned in the Upward Direction Position and Opened

Figure 6A:
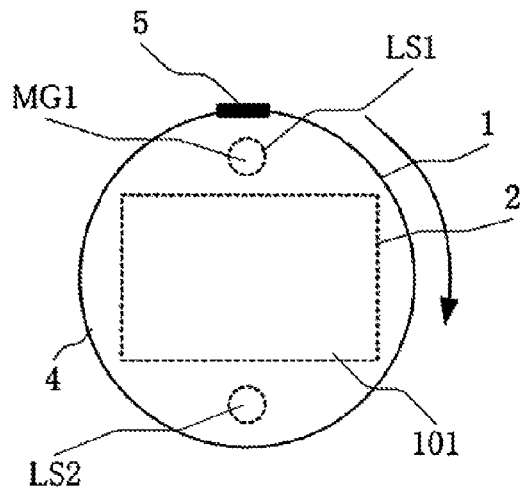
FIGS. 6(a) and 6(b) present front views of a cover closed state for the display apparatus of FIG. 5.

Now, let us assume that the cover 4 is in the closed state and positioned in the upward direction position (FIG. 6(a)). In this case, the magnet MG1 provided to the cover 4 is proximate to the reed switch LS1, which is turned ON. The reed switch LS2 is turned OFF because the magnet MG1 provided to the cover 4 has moved far away.

If the reed switch LS1 is ON and the reed switch LS2 is OFF (step S201: YES), then the upward direction determining unit 3-2 determines, based on the ON/OFF states of the reed switches LS1, LS2, that the upward direction of the liquid crystal display part 2 shall be the display direction of the measurement value on the seven segment display group MSG (step S202) and issues a normal direction display instruction to the display control unit 3-1.

The display control unit 3-1 receives the normal direction display instruction from the upward direction determining unit 3-2 and stores the instructed display direction (step S203). At this time, the display control unit 3-1 does not display the measurement value in the instructed display direction and turns all displays on the liquid crystal display part 2 OFF (step S204).

Figure 9A:
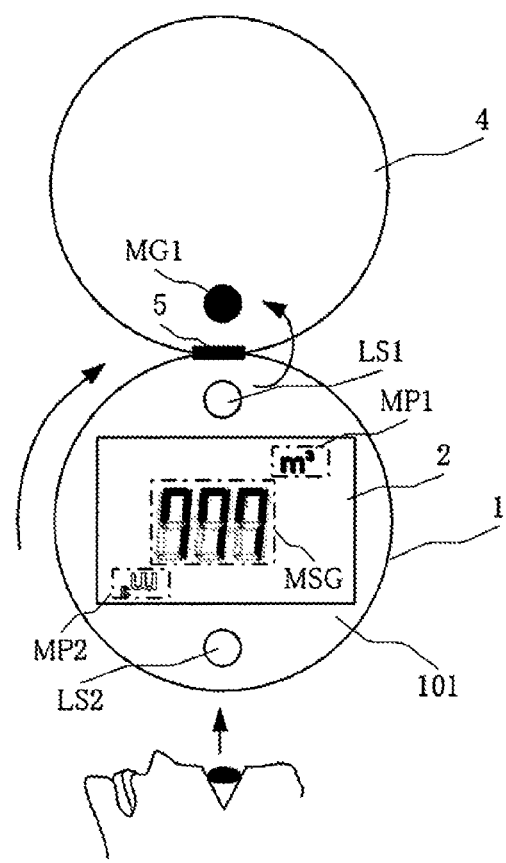
FIGS. 9(a) and 9(b) show a normal direction display example and an inverse direction display example, respectively, of a measurement value displayed in the liquid crystal display part of the display apparatus of FIG. 5.

If the cover 4 is opened from this state (refer to FIG. 9(a)), then the reed switch LS1 turns OFF because the magnet MG1 provided to the cover 4 moves far away from the reed switch LS1. At this time, the cover open/close determining unit 3-3 verifies that both reed switches LS1, LS2 are turned OFF (step S201: NO), determines that the cover 4 is open, and notifies the display control unit 3-1 to that effect.

When the display control unit 3-1 is notified by the cover open/close determining unit 3-3 that the cover 4 is open, it reads out the display direction stored in step S203 (the normal direction display) (step S205) and sets the display of the measurement value on the seven segment display group MSG to the normal direction display (step S206).

Namely, as shown in FIG. 9(a), the upward direction of the measurement value displayed in the seven segment display group MSG is set to the upward direction of the liquid crystal display part 2. In addition, the unit character pattern MP1, wherein the upward direction of the liquid crystal display part 2 is the upward direction of the character string, is displayed, and the unit character pattern MP2, wherein the downward direction of the liquid crystal display part 2 is the upward direction of the display string, is not displayed (step S207).

Thereby, if the operator views the liquid crystal display part 2 from the downward direction side, he or she can correctly read the measurement value, including the unit thereof, merely by rotating the cover 4 so that it is positioned in the upward direction and opening the cover 4.

If the cover 4 is closed after the measurement value is read, the reed switch LS1 turns ON; therefore, in response to YES in step S201, the method proceeds to the processes in steps S202, S203, S204 and thereby returns to the state wherein all displays on the liquid crystal display part 2 are turned OFF.

If the Cover is Positioned in the Downward Direction Position and Opened

Figure 6B:
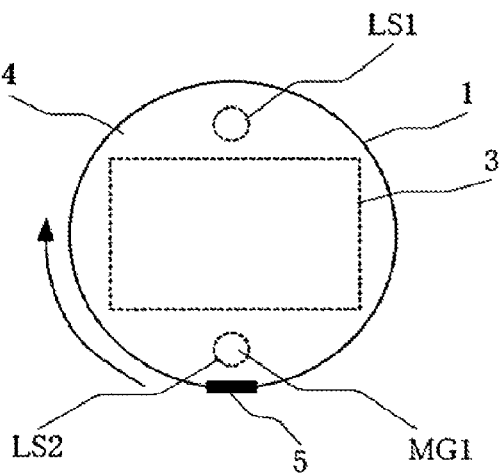

Next, let us assume that the cover 4 is rotated in the closed state and positioned in the downward direction (FIG. 6(b)). In this case, the magnet MG1 provided to the cover 4 is proximate to the reed switch LS2, which is turned ON. The reed switch LS1 is turned OFF because the magnet MG1 provided to the cover 4 has moved far away.

If the reed switch LS2 is ON and the reed switch LS1 is OFF (step S201: YES), then the upward direction determining unit 3-2 determines, based on the ON/OFF states of the reed switches LS2, LS1, that the downward direction of the liquid crystal display part 2 shall be the display direction of the measurement value on the seven segment display group MSG (step S202) and issues an inverse direction display instruction to the display control unit 3-1.

The display control unit 3-1 receives the inverse direction display instruction from the upward direction determining unit 3-2 and stores the instructed display direction (step S203). At this time, the display control unit 3-1 does not display the measurement value in the instructed display direction and turns all displays on the liquid crystal display part 2 OFF (step S204).

Figure 9B:
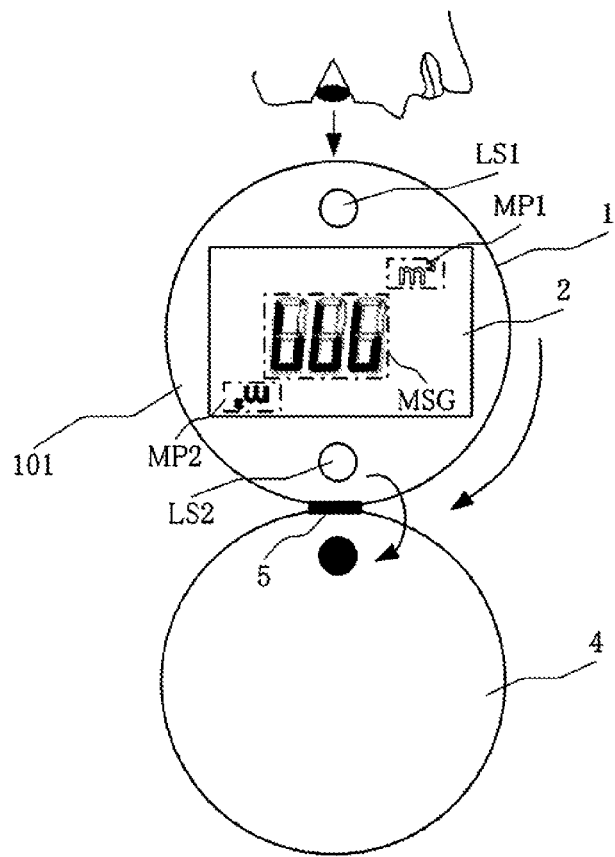

If the cover 4 is opened from this state (refer to FIG. 9(b)), then the reed switch LS2 turns OFF because the magnet MG1 provided to the cover 4 moves far away from the reed switch LS2. At this time, the cover open/close determining unit 3-3 verifies that both reed switches LS1, LS2 are turned OFF (step S201: NO), determines that the cover 4 is open, and notifies the display control unit 3-1 to that effect.

When the display control unit 3-1 is notified by the cover open/close determining unit 3-3 that the cover 4 is open, it reads out the display direction stored in step S203 (the inverse direction display) (step S205) and sets the display of the measurement value on the seven segment display group MSG to the inverse direction display (step S208).

Namely, as shown in FIG. 9(b), the upward direction of the measurement value displayed in the seven segment display group MSG is set to the downward direction of the liquid crystal display part 2. In addition, the unit character pattern MP2, wherein the downward direction of the liquid crystal display part 2 is the upward direction of the character string, is displayed, and the unit character pattern MP1, wherein the upward direction of the liquid crystal display part 2 is the upward direction of the display string, is not displayed (step S209).

Thereby, if the operator views the liquid crystal display part 2 from the upward direction side, he or she can correctly read the measurement value, including the unit thereof, merely by rotating the cover 4 so that it is positioned in the downward direction and opening the cover 4.

If the cover 4 is closed after the measurement value is read, the reed switch LS2 turns ON; therefore, in response to YES in step S201, the method proceeds to the processes in steps S202, S203, S204 and thereby returns to the state wherein all displays on the liquid crystal display part 2 are turned OFF.

As can be understood from the explanation above, in the display apparatus 101 of the second embodiment wherein the segment type liquid crystal display part 2 is used, the upward direction of the measurement value on the liquid crystal display part 2 can be switched by rotating the cover 4; this makes it possible both to reduce the power consumption as compared with a matrix type liquid crystal display part and to extend the battery life of the electromagnetic flowmeter 201. In addition, the seven segment display group MSG provided to the liquid crystal display part 2 can be used regardless of the display direction, which avoids an increase in the size of the liquid crystal display part 2 and reduces cost.

Furthermore, in the second embodiment, all displays on the liquid crystal display part 2 are turned OFF if the cover 4 is closed, but they do not necessarily have to be turned OFF. Namely, even if the cover 4 is closed, the displays on the liquid crystal display part 2 may alternatively stay ON.

In addition, in the second embodiment, the rotation and the open/close state of the cover 4 are detected by combining the magnet MG1 and the reed switches LS1, LS2, but the rotation and the open/close state of the cover 4 may alternatively be detected by other methods.

In addition, in the second embodiment according to the present invention, the rotation and the open/close state of the cover 4 are detected by a single sensor that combines the magnet MG1 and the reed switches LS1, LS2, but they may alternatively be detected by separate sensors, and the display direction of the measurement value on the liquid crystal display part 2 when the cover 4 is opened may alternatively be determined and specified thereby.

In addition, instead of opening the cover 4 by rotating it, it is possible to alternatively use an upward direction double swing type cover as the cover 4 and thereby to enable opening of the cover 4 regardless of the orientation of the upward direction.

In addition, as a measure for dealing with the possibility that a worker may forget to close the cover 4, the method may alternatively proceed to the processes of steps S202, S203, S204 if the reed switches LS1, LS2 are OFF for a certain fixed time, at which point all displays on the liquid crystal display part 2 may return to the OFF state.

Embodiment of a Display Configuration on the Liquid Crystal Display Part

Figure 10:
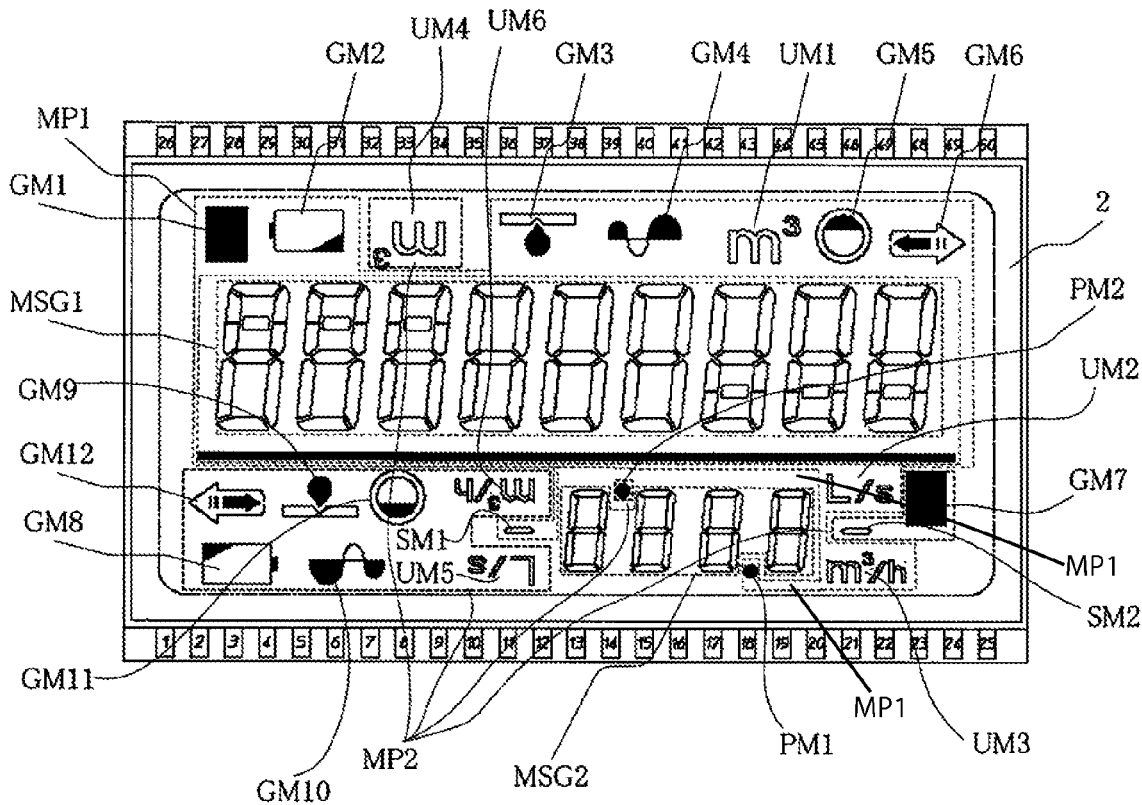
FIG. 10 illustrates an embodiment of a display configuration on the liquid crystal display part according to the present invention.

In order to simplify the explanation in the first and second embodiments discussed above, the seven segment display group MSG that displays the measurement value on the liquid crystal display part 2 comprises only three seven segment displays SG1, SG2, SG3, and in addition, the character patterns MP1, MP2 comprise only the character string "$m^3$." However, a variety of other configurations are readily conceivable to one skilled in the art in various actual applications. FIG. 10 shows an example of such a configuration.

In FIG. 10, two seven segment display groups MSG1 and MSG2 display measurement values. The seven segment display group MSG1 displays the cumulative value of the flow volume, and the seven segment display group MSG2 displays the instantaneous value of the flow volume.

In addition, in FIG. 10, the first character pattern MP1 comprises the combination of pictographs GM1-GM6, unit characters UM1-UM3, a sign character SM1, and a decimal point character PM1. In addition, the second character pattern MP2 comprises the combination of pictographs GM7-GM12, unit characters UM4-UM6, a sign character SM2, and a decimal point character PM2.

In the character patterns MP1, MP2, the pictographs GM1, GM7 are pilot lamps that flash when the fluid is flowing. The pictographs GM2, GM8 are battery alarms that report a low battery condition. The pictographs GM3, GM9 are leakage alarms that report the occurrence of a leak. The pictographs GM4, GM10 are excess fluid volume alarms that report the flow of an excessively large fluid volume. The pictographs GM5, GM11 are not-full alarms that report that the fluid level is not in the full state. The pictographs GM6, GM12 are reverse flow alarms that report the occurrence of a reverse flow.

In the character patterns MP1, MP2, the unit characters UM1, UM4 display the unit of the flow volume cumulative value displayed in the seven segment display group MSG1, and the unit characters UM2, UM5, and UM3, UM6 display the units of the flow volume instantaneous value displayed in the seven segment display group MSG2. The sign characters SM1, SM2 display a minus sign with respect to the flow volume instantaneous value displayed in the seven segment display group MSG2. The decimal point characters PM1, PM2 display the decimal point position with respect to the flow volume instantaneous value displayed in the seven segment display group MSG2.

Figure 11:
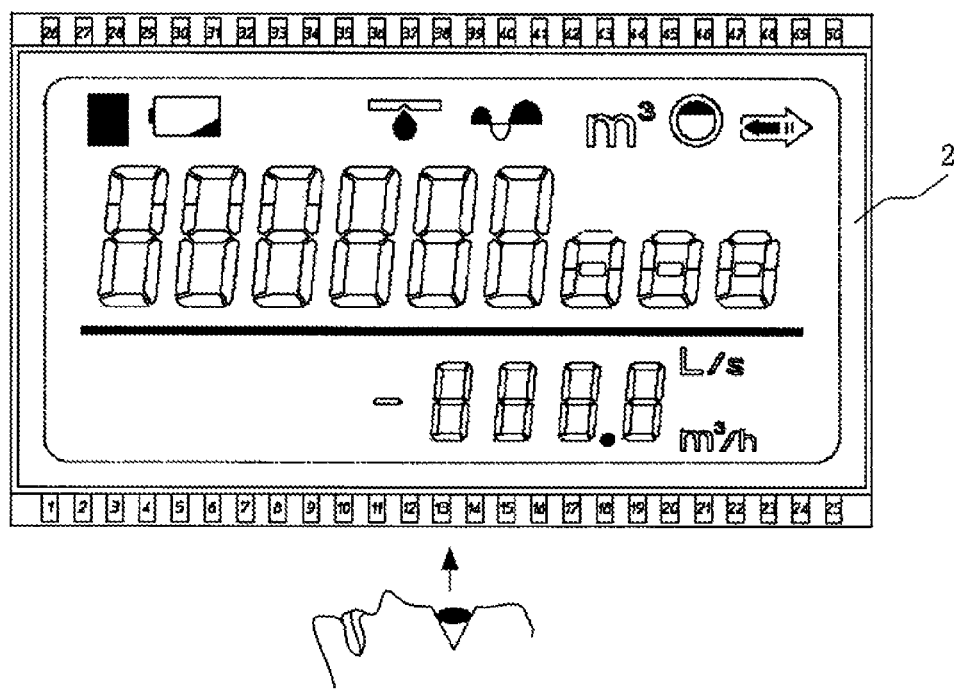
FIG. 11 illustrates the display configuration example of FIG. 10 wherein the upward direction serves as the display direction (normal direction display) of the measurement value.

FIG. 11 shows the display state for the case wherein the upward direction of the liquid crystal display part 2 serves as the display direction of the measurement value. In this case, the pictographs, the unit characters, the sign character, and the decimal point character in the first character pattern MP1 are displayed as needed, and the measurement values are displayed in the seven segment display groups MSG1, MSG2 in the normal direction.

Figure 12:
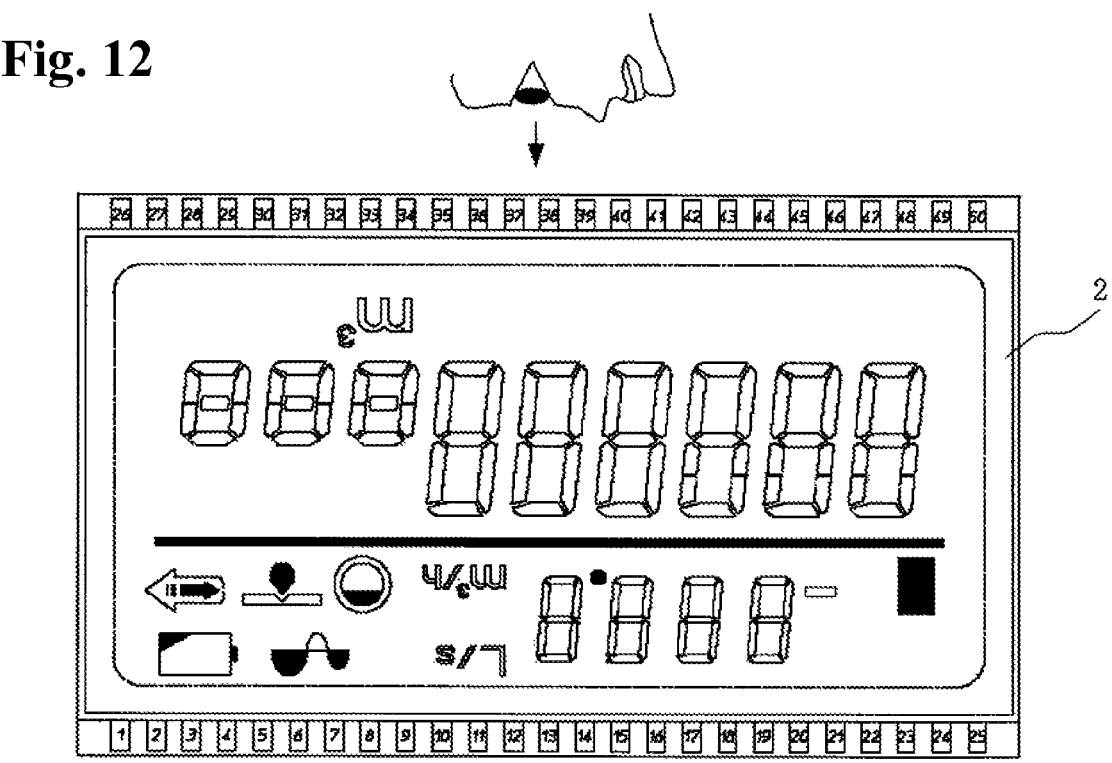
FIG. 12 illustrates the display configuration example of FIG. 10 wherein the downward direction serves as the display direction (inverse direction display) of the measurement value.

FIG. 12 shows the display state for the case wherein the downward direction of the liquid crystal display part 2 serves as the display direction of the measurement value. In this case, the pictographs, the unit characters, the sign character, and the decimal point character in the second character pattern MP2 are displayed as needed, and the measurement values in the seven segment display groups MSG1, MSG2 are displayed in the inverse direction.

Furthermore, in the seven segment display group MSG1, the three seven segment displays that are shorter in height represent the numeric value after the decimal point. In addition, as with the pictographs GM1, GM7, the first character pattern MP1 and the second character pattern MP2 are used regardless of the display direction of the measurement value; however, it is also possible to combine the two character patterns into one. Making the pictographs displayed in the first character pattern MP1 and the second character pattern MP2 optimally available for common use makes it possible to reduce both the display area of the liquid crystal display part 2 and cost.

Figure 13A:
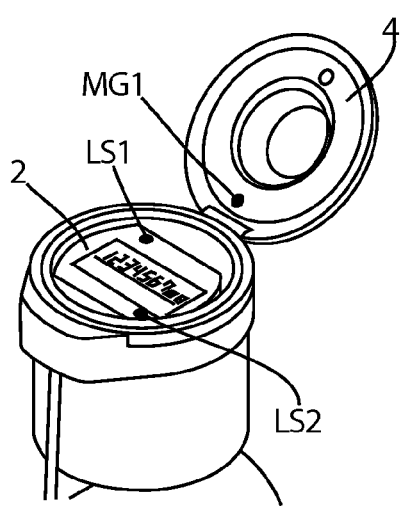
FIGS. 13(a) and 13(b) show oblique views of a cover provided to the display apparatus of FIG. 10.
Figure 13B:
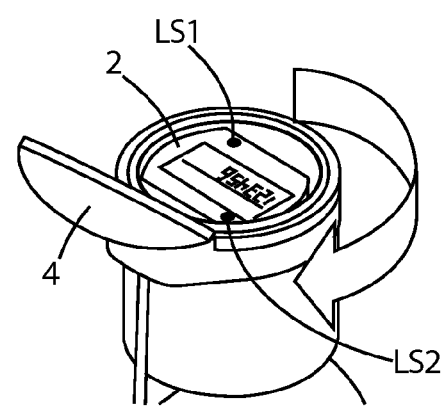

FIGS. 13(a) and 13(b) show oblique views of the case wherein the cover 4 is provided to the display apparatus that comprises the liquid crystal display part 2. FIG. 13(a) shows an open state wherein the cover 4 is positioned in the upward direction position and FIG. 13(b) shows an open state wherein the cover 4 is positioned in the downward direction position.

Figure 14:
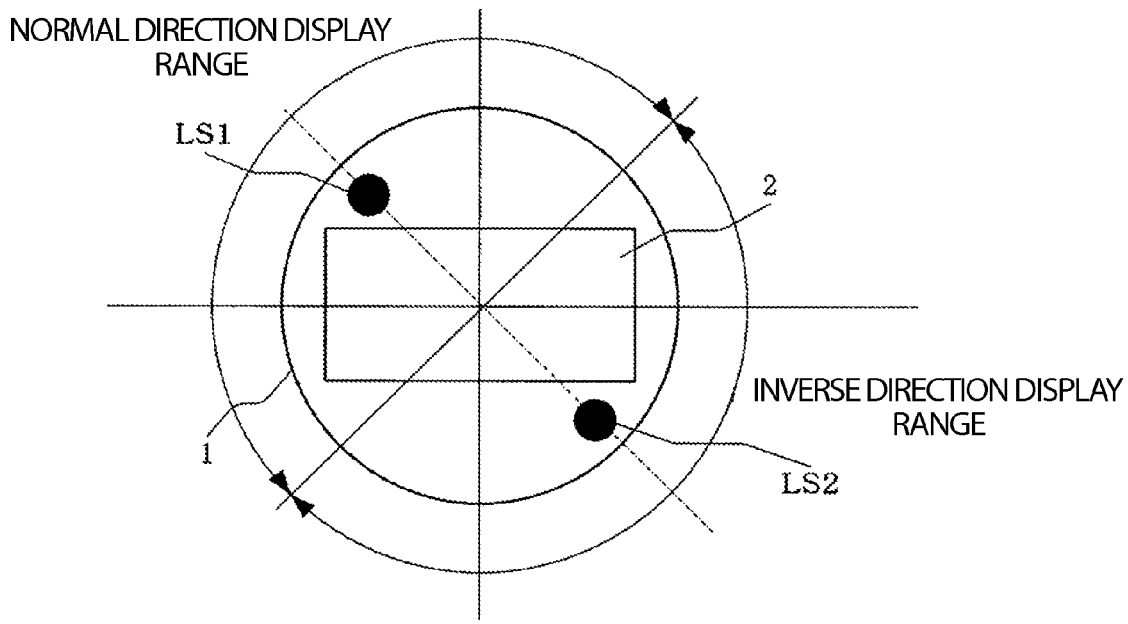
FIG. 14 shows the angular ranges of the normal direction display and the inverse direction display for the case wherein reed switches are disposed on the upward and downward direction sides of the liquid crystal display part of the to the display apparatus of FIG. 10 at positions along a diagonal.
Figure 15:
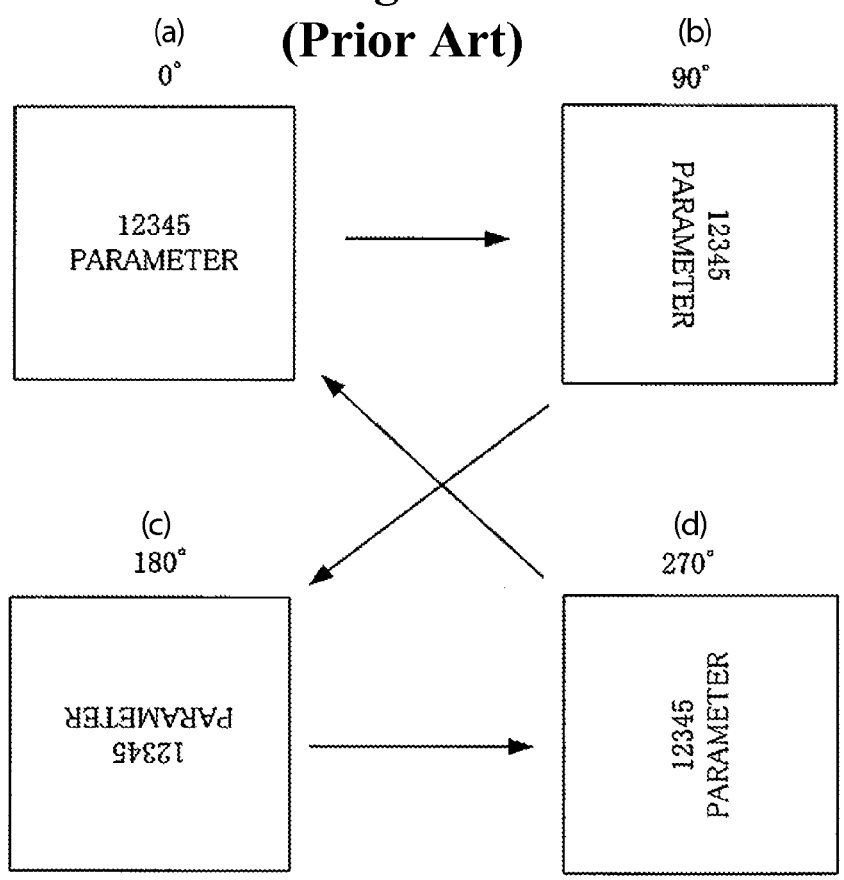
FIG. 15 illustrates a series of display directions provided in a conventional dot matrix type liquid crystal display

In the present example, the reed switches LS1, LS2 are provided to the liquid crystal display part 2 on the upward and downward direction sides at positions located along a diagonal. Disposing the reed switches LS1, LS2 in this manner makes it possible to set the angular range of the normal direction display to 180° around the reed switch LS1 and to set the angular range of the inverse direction display to 180° around the reed switch LS2, as shown in FIG. 14.

Thus, those skilled in the art will readily recognize numerous adaptations and modifications, which can be made to the present invention which fall within the scope of the present invention as defined in the claims. Moreover, it is intended that the scope of the present invention include all foreseeable equivalents to the elements and structures as described with reference to FIGS. 1-5. Accordingly, the invention is to be limited only by the scope of the claims and their equivalents.

For example, while the embodiments of the present invention described above provide examples wherein the display apparatus is mounted in the field to an electromagnetic flowmeter, the display apparatus may alternatively be mounted in a factory to, for example, a pressure gauge, a thermometer, a water meter attached to service water piping, or a gas meter attached to gas piping.

In addition, in the embodiments described above, the seven segment display group displays a measurement value, but the character string to be displayed is not limited to a measurement value. For example, the apparatus to which the display apparatus is mounted may be a clock and the seven segment display group may display the time.

In addition, in the embodiments described above, the upward direction of the character string displayed in the seven segment display group is switched manually. However, if the display apparatus is mounted to a wall-mounted apparatus (for example, a wall-mounted clock), then an automatic switch, such as a gravity sensor, may be provided and the upward direction of the character string displayed in the seven segment display group may be switched automatically.

In addition, in the embodiment discussed above, each character has seven segments, but the present invention is not limited thereto. For example, each character may have 16 segments that are capable of displaying a full alphabet.

With seven segments it is possible to display, in addition to the ten numerals, a number of alphabetic characters, but that number is limited. By using 16 segments, it is possible to increase the number of characters that can be displayed, and thereby to widen the range of application beyond measuring instruments that display measurement values.

The details of a 16 segment display are described, for example, in Japanese Unexamined Patent Application Publication No. H6-129650 (hereinafter "Patent Document 2"), which is hereby incorporated by reference herein in its entirety, and therefore further explanation thereof is omitted herein. Furthermore, in a 16 segment display, as in a seven segment display, it is possible to display the character string by inverting the upward direction.

In addition, in the embodiments described above, the display part is a liquid crystal display part, but it may alternatively be, for example, a light emitting diode (LED), a cold cathode discharge lamp, a vacuum fluorescent display, or an incandescent filament.

What is claimed is:

1. A display apparatus, comprising:
    a display part that is provided with a segmented character display group, wherein each character is represented at a fixed position of the display group by the combination of ON/OFF states of a plurality of display elements at the fixed position of the character;
    a display control unit configured to switch a display orientation between an upward direction of a character string displayed in the segmented character display group and an alternate character string direction; and
    an upward direction determining unit that instructs the display control unit to switch the display orientation,
    wherein the display part further comprises:
        first and second character patterns, the displays of which are alternately switched such that they are each interlocked for display in only one of the display orientations.

2. The display apparatus according to claim 1, comprising:
    a cover, which openably and closably covers the display part;
    and a cover position sensor, which senses an open/close orientation of the cover with respect to the display part; wherein, based on a first detection result of the cover position sensor, the upward direction determining unit instructs the display control unit to switch the display orientation.

3. The display apparatus according to claim 2, wherein:
    the display control unit is further configured to store an indication of the display orientation and to switch the display to an "off" state after a predetermined period of time or upon receiving another instruction from the cover position sensor based on a second detection result.

4. The display apparatus according to claim 1, wherein:
    the display apparatus has one of an electromagnetic flowmeter, a pressure gauge, a thermometer, a water meter and a gas meter, to which the display apparatus is mounted.

5. A display apparatus comprising:
    a display part that is provided with a segmented character display group, wherein each character is represented at a fixed position of the display group by the combination of ON/OFF states of a plurality of display elements at the fixed position of the character;
    a display control unit configured to switch a display orientation between an upward direction of a character string displayed in the segmented character display group and an alternate character string direction;
    an upward direction determining unit that instructs the display control unit to switch the display orientation;
    a cover, which openably and closably covers the display part; and
    a cover position sensor, which senses an open/close orientation of the cover with respect to the display part,
    wherein, based on a first detection result of the cover position sensor, the upward direction determining unit instructs the display control unit to switch the display orientation.

6. The display apparatus according to claim 5, wherein:
    the display control unit is further configured to store an indication of the display orientation and to switch the display to an "off" state after a predetermined period of time or upon receiving another instruction from the cover position sensor based on a second detection result.

* * * * *